United States Patent
Pang

(10) Patent No.: US 7,660,271 B2
(45) Date of Patent: Feb. 9, 2010

(54) SPANNING TREE BPDU PROCESSING METHOD AND SYSTEM FACILITATING INTEGRATION OF DIFFERENT NATIVE VLAN CONFIGURATIONS

(75) Inventor: Tak Ming Pang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 488 days.

(21) Appl. No.: 11/202,802

(22) Filed: Aug. 11, 2005

(65) Prior Publication Data

US 2007/0036092 A1    Feb. 15, 2007

(51) Int. Cl.
H04L 12/28    (2006.01)
(52) U.S. Cl. ............... 370/256; 370/401; 370/408
(58) Field of Classification Search ........... 370/406, 370/465, 256, 254, 252, 407
See application file for complete search history.

(56) References Cited

U.S. PATENT DOCUMENTS

| | | | | |
|---|---|---|---|---|
| 6,188,694 | B1 * | 2/2001 | Fine et al. | 370/402 |
| 6,944,130 | B1 * | 9/2005 | Chu et al. | 370/238.1 |
| 7,180,899 | B2 * | 2/2007 | De Silva et al. | 370/395.31 |
| 2001/0025318 | A1 * | 9/2001 | Higashiyama | 709/238 |
| 2007/0110078 | A1 * | 5/2007 | De Silva et al. | 370/395.53 |

OTHER PUBLICATIONS

IEEE Computer Society, 802.1D 2004 Edition, IEEE Standard for Local and metropolitan area networks, *Media Access Control (MAC) Bridges*, Copyright Jun. 9, 2004, IEEE.
IEEE Computer Society, 802.1Q 2003 Edition, IEEE Standard for Local and metropolitan area networks, *Virtual Bridged Local Area Networks*, Copyright May 7, 2003, IEEE.
Clark, Kennedy and Hamilton, Kevin, *CCIE Professional Development: Cisco LAN Switching*, Cisco Systems, pp. 280-283.
PCT Notification of Transmittal of The International Search Report and The Written Opinion of the International Searching Authority, or the Declaration (PCT Rule 44.1), dated Dec. 18, 2006, International Application No. PCT/US06/029659).
"Configuring the Avaya S8700 Media Server with Avaya G600 Media Gateway and Avaya IP Telephones in a Cisco ISL Environment" [online] 2002, pp. 1-11.
06 788 941.0—1525, Communication pursuant to Article 94(3) EPC, European Patent Office-Germany, Jun. 3, 2009.

* cited by examiner

*Primary Examiner*—Dang T Ton
*Assistant Examiner*—Mandish Randhawa
(74) *Attorney, Agent, or Firm*—Baker Botts L.L.P.

(57) ABSTRACT

Methods, apparatuses and systems directed to enhancing the interoperability of network devices with static native virtual LAN (VLAN) configurations with other network devices where the native VLAN is a configurable parameter. In some implementations, the network devices having configurable native VLANs conditionally add VLAN tags to common Spanning Tree Protocol (STP) Bridge Protocol Data Units (BPDUs) transmitted to network devices where the native VLAN is static and strip any VLAN tags from the common STP BPDUs that are received.

14 Claims, 6 Drawing Sheets

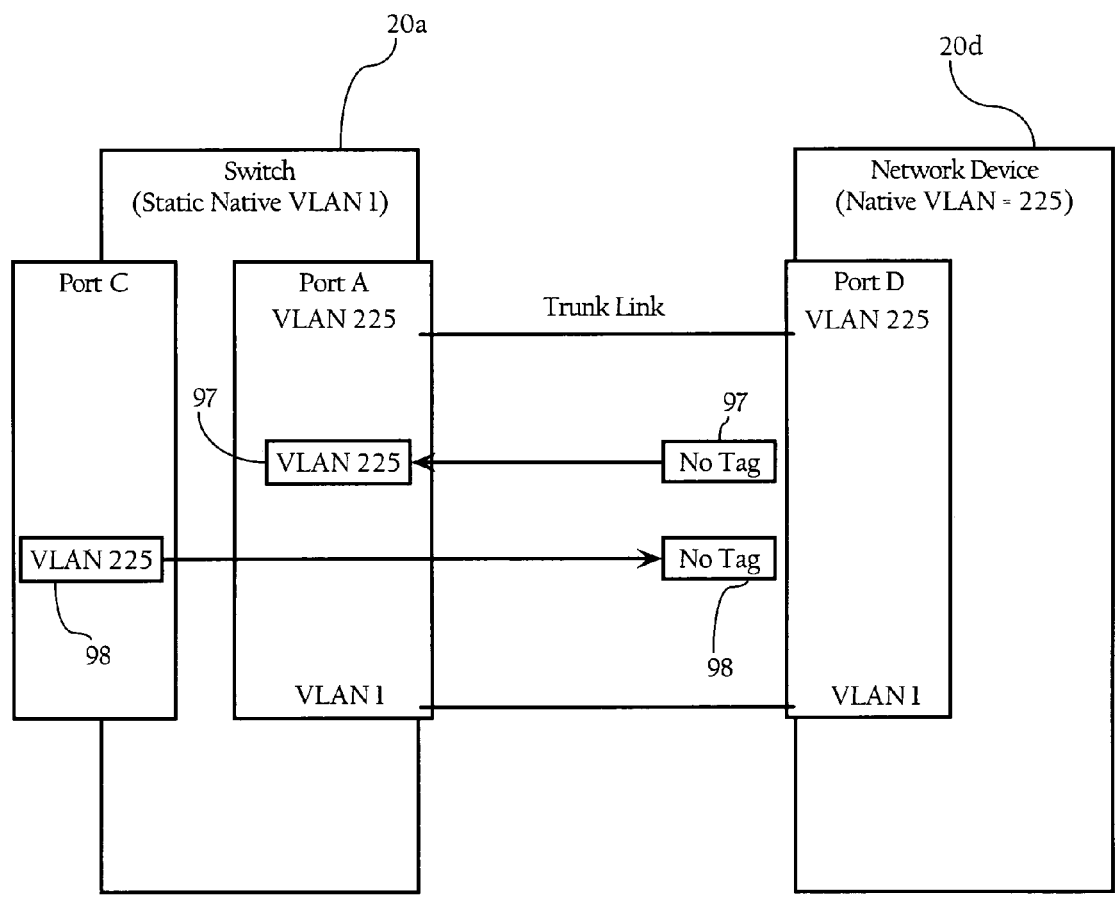
Fig. _6

SPANNING TREE BPDU PROCESSING METHOD AND SYSTEM FACILITATING INTEGRATION OF DIFFERENT NATIVE VLAN CONFIGURATIONS

FIELD OF THE INVENTION

The present invention relates to computer networks and, more particularly, to Spanning Tree Protocols in Link Layer networks.

BACKGROUND OF THE INVENTION

Spanning Tree Protocol is a link management protocol that provides path redundancy while preventing undesirable bridging loops in the network. For an Ethernet Layer-2 network to function properly, only one active path can exist between two stations. Multiple active paths between stations cause traffic to loop in the network. If a bridging loop exists in the network topology, it can cause broadcast and multicast frames to be duplicated, creating a traffic storm. When bridging loops occur, a bridge may see the same stations appearing on both of its interfaces. Additionally, switches may see the same stations appearing on different ports at different times. This condition confuses the frame forwarding logic. To provide path redundancy, Spanning Tree Protocol defines a tree that spans all devices in the Layer-2 network. Spanning-Tree Protocol forces all redundant data paths into a standby (blocked) state. If the network topology changes, or if the network Spanning Tree Protocol configuration changes, the spanning-tree algorithm reconfigures the spanning-tree topology and reestablishes the link by activating the standby path or putting active links into standby state. The IEEE 802.1D Standard, entitled "Media Access Control (MAC) Bridges," defines a Spanning Tree Protocol for use in local area networks (LANs).

Bridges in an extended LAN participating in Spanning Tree Protocol gather information on other bridges in the network through observation and forwarding of STP messages. These STP messages are so-called bridge protocol data units (BPDUs). This results in selection of a unique root bridge for the stable spanning tree network topology and the removal of redundant path in the switched network by placing redundant switch ports in a blocked state. Spanning Tree Protocol operation is transparent to end stations, which are unaware of the network topology of the LAN segment to which they are being connected. Generally speaking, the root bridge generates configuration BPDUs, which other devices process and multicast out at STP-enabled ports.

A virtual LAN (VLAN) is a switched network that is logically segmented by one or more criteria without regard to the physical location of the end stations. For example, end stations might be grouped according to company departments, such as engineering or accounting rather than their physical locations. Multiple VLANs can be defined over the same network infrastructure to segment a LAN to different broadcast domains. The IEEE 802.1Q standard, entitled "Virtual Bridged Local Area Networks," sets forth a VLAN implementation in common use today.

To implement a VLAN, ports on the same or different bridges/switches are logically grouped so that traffic is confined only to members of that group. This feature restricts broadcast, multicast, and unicast flooding traffic only to ports included in a certain VLAN. For VLANs to span multiple switches, trunk ports have to be configured on the switches to establish a trunk link to connect the switches. A trunk link carries traffic for all VLANs by identifying the originating VLAN as the frame is carried between the switches. To this end, VLAN implementations employ frame tagging—that is, frames received from an end station connected to an access port associated with a given VLAN are tagged with an identifier (VLAN ID) corresponding to that VLAN prior to transmission across a trunk link. Frame tagging allows switches and network devices to determine the VLAN to which different frames belong when the frames are transmitted across trunk links. The frames can be tagged with VLAN information according to the IEEE 802.1Q standard, or other protocols (such as the Inter-Switch Link (ISL), a proprietary trunking mechanism developed by Cisco Systems, Inc.).

The IEEE 802.1Q standard also defines a native VLAN. According to this standard, a trunk port does not tag frames that are forwarded to any port that corresponds to the native VLAN. Some vendors allow the native VLAN to be a configurable parameter for their switching/bridging devices. For example, assume for didactic purposes that a network device supports configuration of up to 64 VLANs. A network administrator can configure multiple VLANs (e.g., 1, 2, 3, 4, etc.) and assign VLAN 2 as the native VLAN. According to this example, if the network device receives a frame on a trunk port without a tag, the network device assumes that the frame belongs to the native VLAN 2 and does not tag the frame. In some network switches (such as certain Ethernet Switches offered by Cisco Systems, Inc.® of San Jose, Calif.), the native VLAN is a fixed parameter that cannot be changed. For example, the native VLAN in many Cisco switches is fixed to VLAN 1.

The fixed nature of the native VLAN on such switches can create certain interoperability problems with other network devices where the native VLAN is configurable and has not been set to VLAN 1. For didactic purposes, FIG. 6 illustrates a trunk port connecting switch 20a (having a static native VLAN 1) and network device 20d (configured with a native VLAN 225). As discussed above, a pair of trunk ports forms a connection (called a trunk link) between two network devices over which traffic from a plurality of VLANs are transmitted. Given the native VLAN configurations discussed above, without some conversion mechanism, untagged frames have different significance between switches 20a and network device 20d, presenting certain interoperability issues. As FIG. 6 illustrates, switch 20a, however, can be configured with knowledge that the native VLAN for network device 20d has been set to VLAN 225. With this knowledge, switch 20a can be configured to do the following to facilitate interoperation between the two network devices. For example, when switch 20a receives a frame 97 bearing no tag over the trunk port A from network device 20d, switch 20a tags the frame with a tag identifying VLAN 225 prior to processing. Still further, when switch 20a receives a frame 98 destined for device 20d and tagged with VLAN 225 from port C, it removes the tag prior to forwarding the frame to port D of network device 20d. Similarly, switch 20a tags unmarked frames with a VLAN 1 tag at port A prior to transmission to device 20d. As discussed in more detail below, the fixed nature of the native VLAN setting on many switches can create certain interoperability problems with other network devices relative to operation of spanning tree protocols and the processing of Bridge Protocol Data Units (BPDUs).

As to the Spanning Tree Protocol, the IEEE 802.1D standard defines a unique spanning tree instance for the entire Layer 2 network. This single spanning tree instance runs on the native VLAN, which can be used to define the paths for all VLANs. This spanning tree instance is also required for Per-VLAN Spanning Tree Plus Protocol (PVST+) VLANs in the same network. The PVST+ Protocol, a proprietary spanning tree protocol developed by Cisco Systems, Inc., allows an instance of STP to run on each VLAN. With PVST+, a root bridge and a unique STP topology is selected and configured for each VLAN. For interoperability with 802.1Q bridges/switches, the PVST+ implementation, however, requires an IEEE 802.1D common spanning tree instance for all bridges/switches. This is accomplished with bridges/switches that forward and process PVST+ BPDUs on each VLAN, as well as BPDUs associated with the common spanning tree instance on the native VLAN, all originated from the STP root bridges. Typically, the common spanning tree instance operates according to the IEEE 802.1D standard. STP root bridges for all VLANs can be physically on the same or different bridges/switches. By configuring a different root priority or port cost on different devices on the VLANs, a network administrator can decide and control at which bridges/switches and ports redundant links are blocked.

Using PVST+, bridges/switches can send or forward PVST+ BPDUs as tagged frames using a pre-determined multicast address as the destination. The IEEE 802.1D BPDUs, according to the protocol, are sent without tags. In both switches 20a and device 20d, IEEE 802.1D BPDUs are either sent or received on their respective native VLANs and do not include an IEEE 802.1Q tag. The VLAN tagging operations implemented by switch 20a on received frames, however, are also applied to the IEEE 802.1D BPDUs, causing them not to be processed. That is, as to BPDUs sourced from network device 20d, an IEEE 802.1D BPDU, which by protocol includes no tag, is tagged with VLAN 225, preventing the IEEE 802.1D BPDU from making it to higher layers of the protocol stack of switch 20a for processing. As a result, both IEEE 802.1D STP and PVST+ do not function properly to block redundant paths. This circumstance can cause flipping of entries in frame forwarding tables if there is any loop topology in the network infrastructure, and can cause affected parts of the network to become inaccessible.

In light of the foregoing, a need exists in the art for methods, apparatuses and systems directed to facilitating the interoperability between network devices having static, unchangeable native VLANs with other network devices where the native VLANs are configurable. Embodiments of the present invention substantially fulfill this need.

DESCRIPTION OF THE DRAWINGS

FIG. 6 is a functional block diagram illustrating the addition and removal of VLAN tags from frames transmitted between network devices.

DESCRIPTION OF PREFERRED EMBODIMENT(S)

Figure 1:
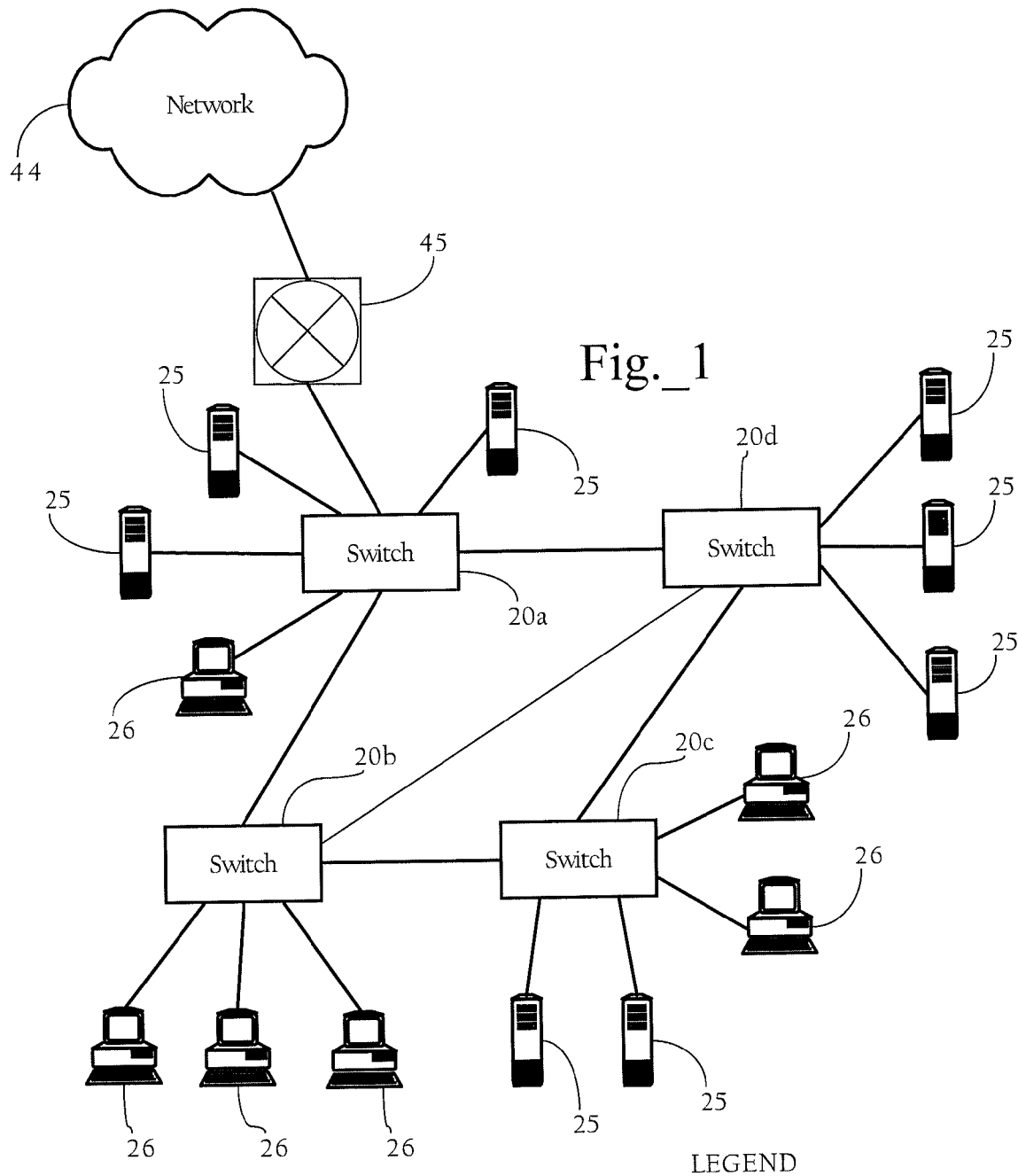
FIG. 1 is a functional block diagram illustrating a network environment in which embodiments of the present invention may operate.

FIG. 1 illustrates a network environment in which embodiments of the present invention may operate. In a specific embodiment of the present invention, the network environment may include switches 20a, 20b, 20c, 20d (collectively referred to as switches 20) operably connected to each other as shown. As FIG. 1 illustrates, end stations (such as servers 25 and client computers 26) are also connected to the switches 20. In one implementation, switches 20 are Ethernet switches implementing a Local Area Network (LAN) or LAN segment. Still further, router 45 and network 44, which may be a LAN, LAN segment, or a Wide Area Network (WAN), allow for the transmission of data between end stations connected to switches 20 and remote hosts reachable over network 44.

Figure 2:
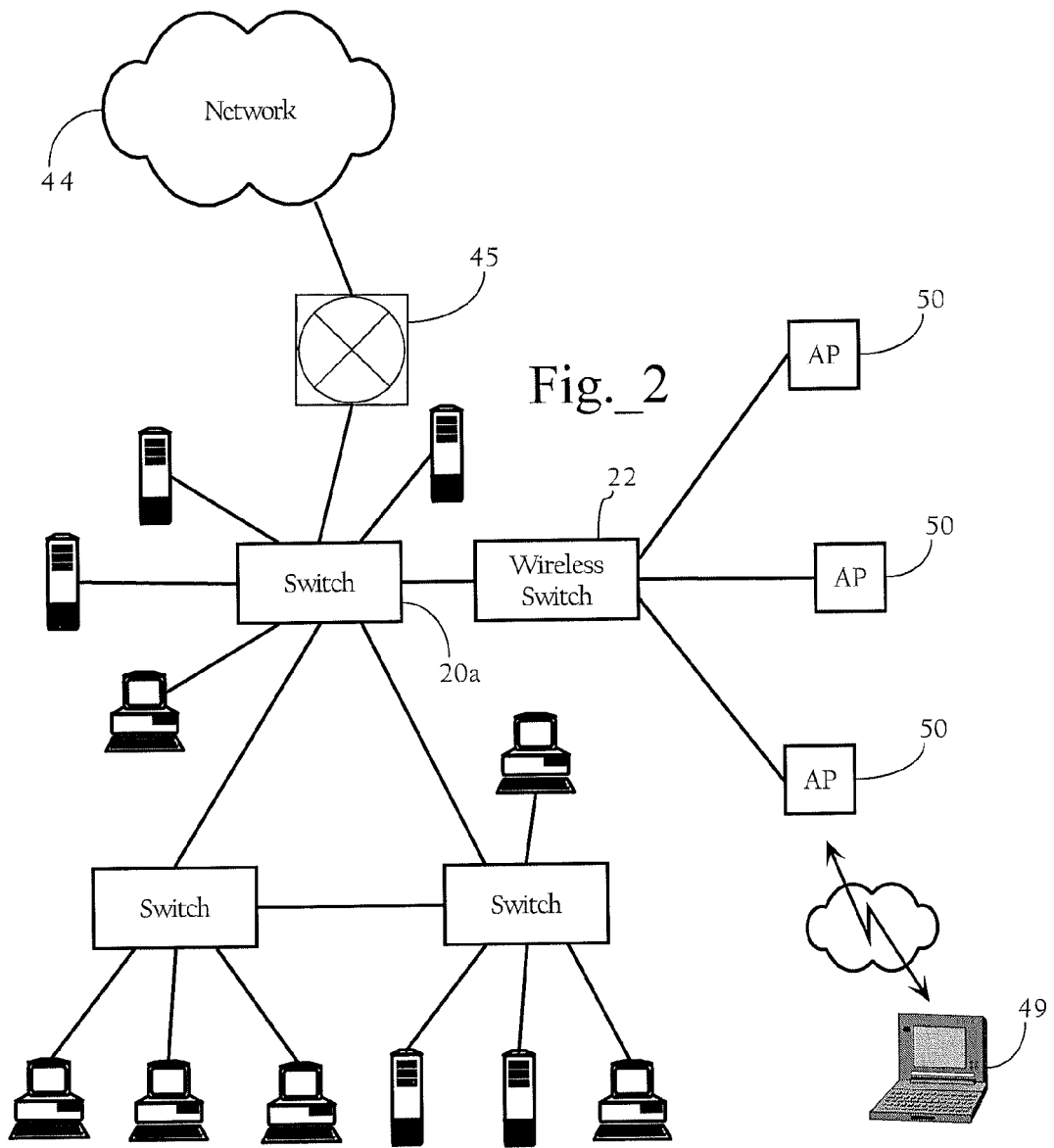
FIG. 2 is a functional block diagram illustrating another network environment in which embodiments of the present invention may operate.

FIG. 2 illustrates another network environment in which embodiments of the present invention can operate. The network illustrated in FIG. 2 is similar to the network illustrated in FIG. 1. However, the illustrated network environment includes wireless switch 22 operably connected to switch 20a and to wireless access points 50. The wireless access points 50 are enabled to wirelessly communicate with remote client devices or mobile stations 49. In one implementation, the wireless access points 50 implement the wireless network protocol specified in the IEEE 802.11 specification. The wireless access points 50 may be autonomous or so-called "fat" access points, or light-weight access points operating in connection with a wireless switch 22, as disclosed in U.S. patent application Ser. No. 10/407,584, now U.S. Pat. No. 7,212,837. The wireless access points 50 are typically connected to the network via Ethernet links; however, other link layer connection protocols or communication means can be employed. In one implementation, a wireless access point 50 comprises a processor, a memory, a network interface (e.g., an Ethernet network interface) for communication with the LAN, a wireless network interface (e.g., an IEEE 802.11 WLAN interface) for communication with one or more mobile stations, a system bus interconnecting these components, as well as software modules (including DHCP clients, CDP modules, access point modules, SNMP functionality, etc.) and device drivers (e.g., network and WLAN interface drivers) stored in persistent memory (e.g., a hard disk drive, flash memory, etc.). At start up, these software components are loaded into memory and then accessed and executed by processor.

Figure 5:
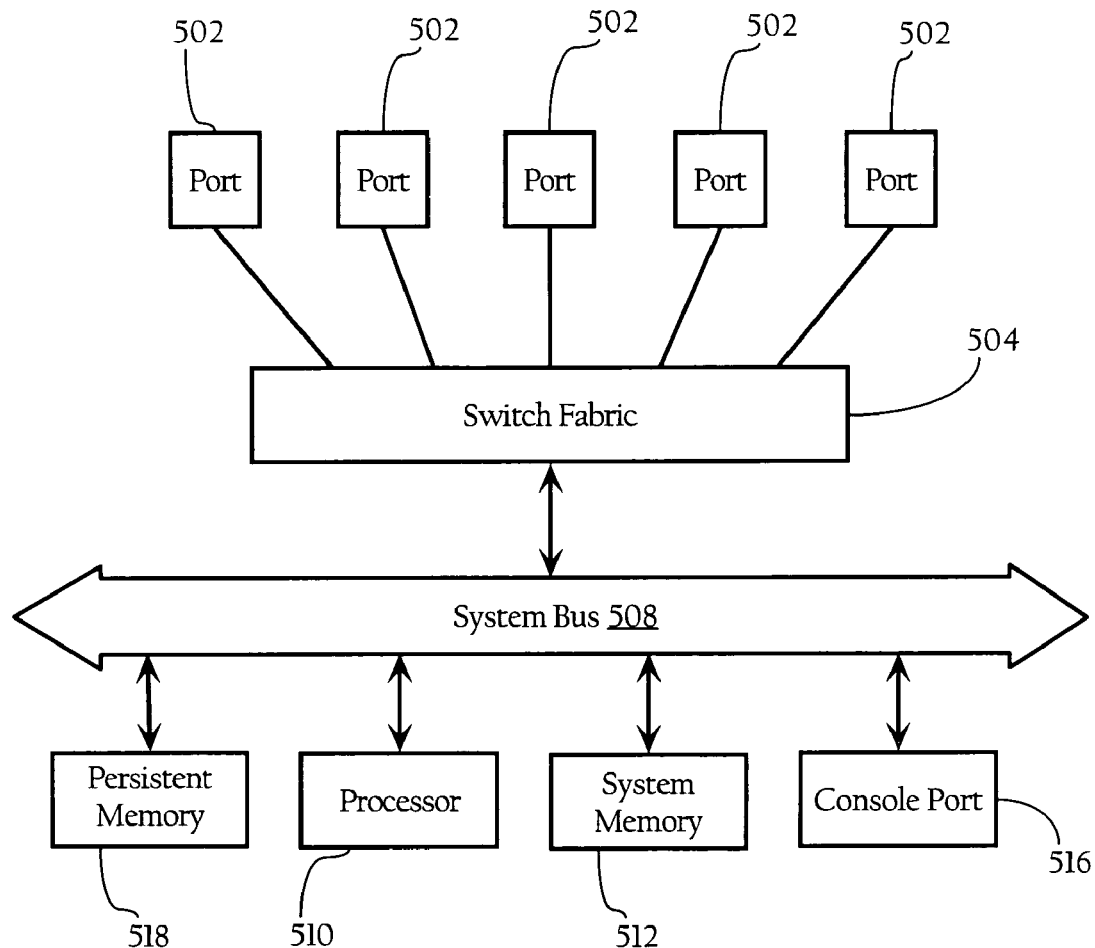
FIG. 5 is a functional block diagram showing the components of a network device according to one implementation of the present invention.

FIG. 5 illustrates the basic hardware components of switches 20 according to one implementation of the invention. As FIG. 5 provides, switches 20 each comprise a processor 510, system memory 512, persistent memory 518 (e.g., flash memory or a hard disk drive), a switch fabric 504 connected to a plurality of ports 502, a system bus 508 interconnecting these components and one or more software modules (loadable into system memory 512) directed to network switching functions (e.g., switch fabric configuration, BPDU processing and the like). By way of example, the one or more software modules may comprise one or more applications physically stored in memory 518 and comprising instructions executable by the processor 510. In one implementation, ports 502 are Ethernet interfaces. The switches 20 may optionally include a console port 516 allowing for administrative access for such purposes as configuration and diagnostics. In one implementation, switches 20 are operative to implement the spanning tree protocol defined in the IEEE 802.1D standard and the Per-VLAN Spanning Tree Plus Protocol (PVST+), described above. For example, a given switch 20 is operative to receive IEEE 802.1D and PVST+ BPDUs on STP-enabled ports, process them, and multicast the BPDUs to devices connected to other STP-enabled ports of the switch 20. In addition, wireless switch 22, in one implementation, includes the same or similar hardware components illustrated in FIG. 5; however, it also includes one or more software modules directed to managing the access points 50.

The present invention provides, in one implementation, methods, apparatuses and systems directed to enhancing the interoperability of network devices with static native VLAN configurations with other network devices where the native VLAN is a configurable parameter. As described in more detail below, in some implementations, the network devices having configurable native VLANs conditionally add VLAN tags to common STP BPDUs transmitted to network devices where the native VLAN is static and strip any VLAN tags from the common STP BPDUs that are received. For didactic purposes, the switches 20a, 20b and 20c are switches where the native VLAN is static, and set to a value of VLAN 1. Of course, the present invention can be applied in situations where the static native VLAN is set to any given VLAN identifier. Switches 20a, 20b, 20c, therefore, forward IEEE 802.1D BPDUs untagged for the common Spanning Tree instance on VLAN 1. PVST+ BPDUs are sent with tags for all VLANs other than VLAN 1. Furthermore, for didactic purposes, switch 20d (in FIG. 1) and wireless switch 22 (in FIG. 2) are network devices where the native VLAN is configurable, and set to VLAN 225. Furthermore, for didactic purposes, assume that switches 20a, 20b, and 20c have been configured with knowledge that switch 20d has the native VLAN set to 225, and to conditionally add or strip tags from the frames transmitted over the respective trunk links between them, as discussed above.

Although embodiments of the present invention are illustrated as operating in connection with switches, the present invention can be implemented in connection with other network devices, such as wireless switch 22, bridges and wireless access points, which implement/participate in spanning tree protocols. Furthermore, the invention can operate in a variety of network environments. For example, the wireless access points 50 can be connected directly to switch 20a. In other implementations, the network environment may also include Layer 2 bridges connecting different LAN segments of different media types or Layer 2 protocols together. Accordingly, the network environments illustrated above are for didactic purposes only. Still further, for didactic purposes, common STP BPDUs refer to bridge protocol data units transmitted as part of the Spanning Tree Protocol instance deployed across all networks devices in the network domain. For example, common STP BPDUs may be the BPDUs transmitted according to the spanning tree protocol defined in the IEEE 802.1D standard. In addition, the term PVST BPDUs refer to messages transmitted as part of the per-VLAN spanning tree protocol implementation. In one implementation, the PVST BPDUs are the BPDUs transmitted according to the Per-VLAN Spanning Tree Plus Protocol (PVST+) defined by Cisco Systems, Inc.

Figure 3:
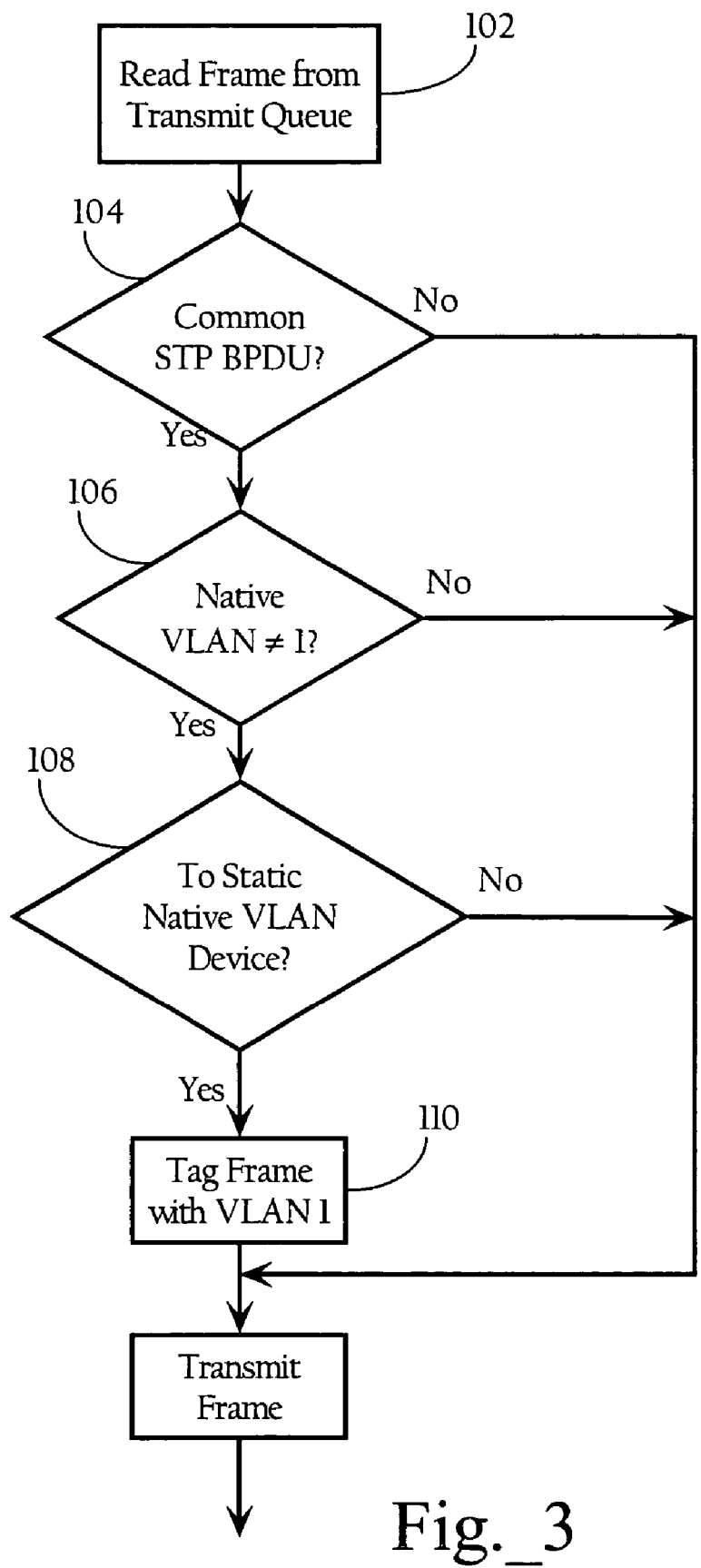
FIG. 3 is a flow chart diagram setting forth a method according to one embodiment of the invention.

FIG. 3 illustrates a process flow, according to one implementation of the invention, implemented by switch 20d. As FIG. 3 illustrates, the native VLAN configured on switch 20d is not VLAN 1. In addition, switch 20d is configured to conditionally add an 802.1Q tag identifying VLAN 1 to IEEE 802.1D BPDUs prior to transmission to switch 20a or any other network device having a native VLAN set to VLAN 1. As FIG. 3 illustrates, when switch 20d reads a frame from a transmit queue (102), it inspects the frame to determine whether it is a common STP BPDU (104). Identification of the common STP BPDU (such as an IEEE 802.1D BPDU) is based on inspection of one or more attributes of the frame. If the frame is a common STP PBDU, the switch 20d then tags the common STP BPDU with an 802.1Q tag identifying VLAN 1 (110), if the native VLAN configured on switch 20d is not VLAN 1 (106) and the receiving device is a network device including a static native VLAN 1 (108). The process flow shown above is implemented by switch 20d, in one implementation, on a per-port basis. For example, when switch 20d receives a common STP BPDU from switch 20c on a given port, it may process the common STP BPDU and multicast the common STP BPDU on all STP-enabled ports. Referring to FIG. 1, switch 20d may then forward and transmit the common STP BPDU to switch 20a and 20b If switch 20a has the native VLAN set statically to VLAN 1 and switch 20d is configured to native VLAN 225, then the common STP BPDUs transmitted from each corresponding port 502 of switch 20d are tagged with an appropriate 802.1Q tag prior to transmission.

Figure 4:
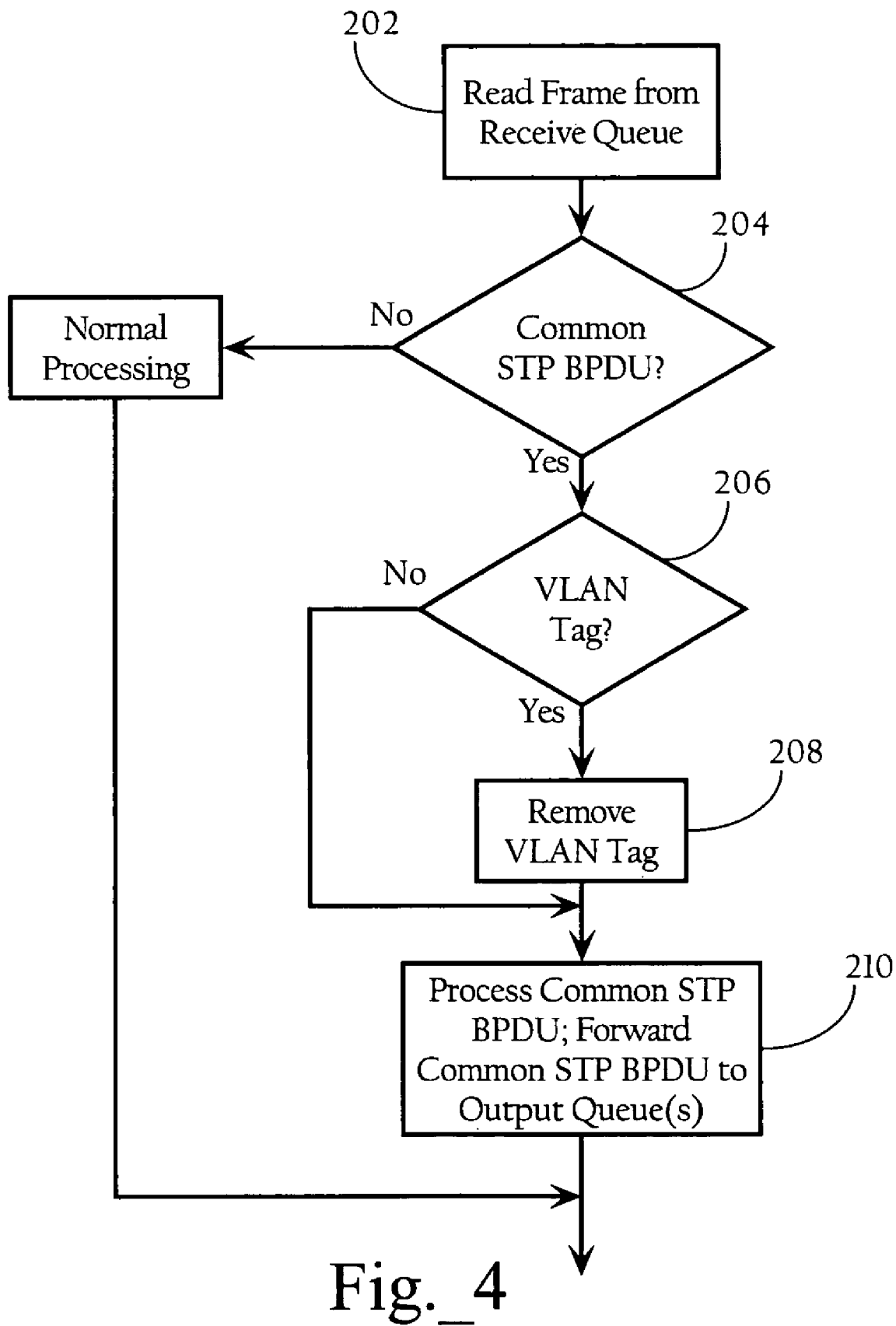
FIG. 4 is a flow chart diagram providing a method according to an embodiment of the present invention.

FIG. 4 provides a process flow, according to one implementation of the present invention, directed to a process for conditionally removing 802.1Q tags added to common STP BPDUs received from another network device. Prior to the process illustrated in FIG. 4, switch 20d has received a common STP BPDU on a given STP-enabled port connected to switch 20c (If switch 20d is the STP root bridge of the common STP instance among all the devices on the native VLAN, it generates this BPDU itself) and has buffered the common STP BPDU on a queue for subsequent processing. As FIG. 4 illustrates, when switch 20d reads a frame from the receive queue (202), it determines whether the frame is a common STP BPDU (204). If it is not, switch 20d applies normal processing to the frame. If the frame is a common STP BPDU, however, switch 20d removes any VLAN tags inserted into the frame (if any) (206, 208) prior to processing the common STP BPDU and forwarding the BPDU to the output queue(s) corresponding to the STP-enable ports of switch 20d (210). A separate process reads the frames from the output queue(s) and transmits them out the corresponding ports. In addition, the process flow illustrated in FIG. 3 may be applied to conditionally tag the outgoing common STP BPDUs (for example, the common STP BPDU forwarded to switch 20a) depending on the configuration of the destination network device. Still further, the VLAN tagging and stripping processes set forth above can be applied regardless of whether switch 20d is the root STP device for the common spanning tree instance or for any of the per-VLAN STP instances.

The foregoing description of the embodiments of the invention has been presented for the purpose of illustration and description only. It is not intended to be exhaustive or to limit the invention to the specific forms disclosed. Many modifications and variations are possible in light of the above teaching. For example, the present invention may be employed with other frame marking schemes such as the use of encapsulating headers. Still further, although the embodiments described above involve Ethernet networks, the present invention can be used in connection with other link layer protocols. It is intended that the scope of the invention be limited by the claims appended hereto, and not by the detailed description.

What is claimed is:

1. A method comprising:

in a first network device operably connected via a trunk link to a second and a third network device, wherein the first, second and third network devices are operative to implement a plurality of virtual LANs (VLANs) including a common spanning tree protocol instance and a plurality of per-VLAN spanning tree protocol instances; wherein the common spanning tree protocol instance is implemented across respective native VLANs on the first, second and third network devices, wherein the first network device supports a configurable native VLAN, and wherein the configurable native VLAN is configured to a first native VLAN, wherein the second network device includes a second native VLAN, wherein the third network device includes the second native VLAN, and wherein the second native VLAN is different from the first native VLAN:

receiving, at the first network device, a bridge protocol data unit (BPDU) transmitted from the second network device;

if the received BPDU is a common spanning tree BPDU:
   removing a VLAN identifier from the common spanning tree BPDU, if the common spanning tree BPDU includes a VLAN identifier, prior to processing thereof and
   conditionally adding a VLAN identifier corresponding to the second native VLAN, prior to transmitting the common spanning tree BPDU to the third network device, based on whether the third network device supports a configurable native VLAN or a fixed native VLAN, the conditionally adding comprising:
      if the second native VLAN included in the third network device is a fixed native VLAN, adding, prior to transmitting the common spanning tree BPDU to the third network device, a VLAN identifier corresponding to the second native VLAN.

2. The method of claim 1 wherein the VLAN identifier is embedded in a tag added to the common spanning tree BPDU.

3. The method of claim 1 wherein the VLAN identifier is embedded in a header encapsulating the common spanning tree BPDU.

4. The method of claim 1 wherein the common spanning tree BPDU is an IEEE 802.1D BPDU.

5. An apparatus operable in a network environment including a first network device and a second network device, wherein the first and second network devices are operative to implement a plurality of virtual LANs (VLANs) including a common spanning tree protocol instance and a plurality of per-VLAN spanning tree protocol instances; wherein the common spanning tree protocol instance is implemented on a native VLAN on the first network device and on a native VLAN on the second network device, the apparatus comprising:
   at least one port;
   a processor;
   a memory;
   an application physically stored in the memory, comprising instructions operable to cause the processor and the apparatus to
      implement, in connection with at least the first network device, the plurality of virtual LANs (VLANs) including the common spanning tree protocol instance and the plurality of per-VLAN spanning tree protocol instances, wherein the common spanning tree protocol instance is implemented on a configurable native VLAN configured to a native VLAN different from the native VLAN of the first and second network devices;
      receive a bridge protocol data unit (BPDU) transmitted from the first network device;
      if the received BPDU is a common spanning tree BPDU:
         remove, if the common spanning tree BPDU includes a VLAN identifier, the VLAN identifier from the common spanning tree BPDU prior to processing thereof and
         conditionally add, prior to transmission of a common spanning tree BPDU to the second network device, a VLAN identifier corresponding to the native VLAN of the second network device based on whether the second network device supports a configurable native VLAN or a fixed native VLAN, wherein the instructions operable to cause the processor and the apparatus to conditionally add the VLAN identifier comprise instructions operable to cause the processor and the apparatus to:
         if the native VLAN of the second network device is a fixed native VLAN, add, prior to transmission of the common spanning tree BPDU to the second network device, a VLAN identifier corresponding to the fixed native VLAN of the second device.

6. The apparatus of claim 5 further comprising a switch fabric operably connected to the at least one port.

7. The apparatus of claim 5 wherein the VLAN identifier is embedded in a tag added to the common spanning tree BPDU.

8. The apparatus of claim 5 wherein the VLAN identifier is embedded in a header encapsulating the common spanning tree BPDU.

9. The apparatus of claim 5 wherein the common spanning tree BPDU is an IEEE 802.1D BPDU.

10. A method comprising:
   in a first network device operably connected via a trunk link to a second and a third network device, wherein the first, second and third network devices are operative to implement a plurality of virtual LANs (VLANs) including a common spanning tree protocol instance and a plurality of per-VLAN spanning tree protocol instances; wherein the common spanning tree protocol instance is implemented across respective native VLANs on the first, second and third network devices, wherein the first network device supports a configurable native VLAN, and wherein the configurable native VLAN is configured to a first native VLAN, wherein the second network device includes a second native VLAN, wherein the third network device includes a third native VLAN, and wherein the third native VLAN is different from the first native VLAN:
   receiving, at the first network device, a bridge protocol data unit (BPDU) transmitted from the second network device;
   determining if the BPDU is a common spanning tree protocol (STP) BPDU;
   if the received BPDU is not a common STP BPDU:
      transmitting the BPDU to the third network device;
   if the received BPDU is a common STP BPDU:
      determining if the common STP BPDU corresponds to the third native VLAN;
      if the common STP BPDU does not correspond to the third native VLAN:
         transmitting the common STP BPDU to the third network device;
      if the common STP BPDU corresponds to the third native VLAN:
         determining if the third native VLAN is a fixed native VLAN; and
         if the third native VLAN is not a fixed native VLAN:
            transmitting the common STP BPDU to the third network device;
         if the third native VLAN is a fixed native VLAN:
            tagging the common STP BPDU with a VLAN identifier corresponding to the third fixed native VLAN; and
            transmitting the tagged common STP BPDU to the third network device.

11. The method of claim 10, further comprising:
  determining if the common STP BPDU includes a previous VLAN identifier tag; and
  removing the VLAN identifier tag if the common STP BPDU includes a previous VLAN identifier tag.

12. The method of claim 10, wherein the VLAN identifier is embedded in a tag added to the common STP BPDU.

13. The method of claim 10, wherein the VLAN identifier is embedded in a header encapsulating the common STP BPDU.

14. The method of claim 10, wherein the common STP BPDU is an IEEE 802.1D BPDU.

* * * * *

UNITED STATES PATENT AND TRADEMARK OFFICE
CERTIFICATE OF CORRECTION

PATENT NO. : 7,660,271 B2  Page 1 of 1
APPLICATION NO. : 11/202802
DATED : February 9, 2010
INVENTOR(S) : Tak Ming Pang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 764 days.

Signed and Sealed this

Thirtieth Day of November, 2010

David J. Kappos
*Director of the United States Patent and Trademark Office*